(12) United States Patent
Baba et al.

(10) Patent No.: US 9,405,095 B2
(45) Date of Patent: Aug. 2, 2016

(54) IMAGING LENS AND IMAGING APPARATUS (71) Applicant: FUJIFILM Corporation, Tokyo (JP)

(72) Inventors: Tomoyuki Baba, Saitama-ken (JP);
Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/631,895

(22) Filed: Feb. 26, 2015

(65) Prior Publication Data

US 2015/0168678 A1    Jun. 18, 2015

Related U.S. Application Data

(63) Continuation of application No. PCT/JP2013/004895, filed on Aug. 19, 2013.

(30) Foreign Application Priority Data

Aug. 29, 2012    (JP) .................. 2012-188196

(51) Int. Cl.
*G02B 9/12*    (2006.01)
*G02B 9/64*    (2006.01)
*G02B 9/62*    (2006.01)
*G02B 13/16*   (2006.01)
*G03B 3/00*    (2006.01)

(52) U.S. Cl.
CPC .. *G02B 9/64* (2013.01); *G02B 9/62* (2013.01); *G02B 13/16* (2013.01); *G03B 3/00* (2013.01)

(58) Field of Classification Search
CPC .............. G02B 9/64; G02B 9/12; G02B 9/14; G02B 3/00; G02B 13/16; G02B 13/0035; G02B 15/14; G02B 15/173
See application file for complete search history.

(56) References Cited

U.S. PATENT DOCUMENTS

| 2009/0273851 | A1  | 11/2009 | Take et al. |
| 2011/0299179 | A1  | 12/2011 | Maetaki |
| 2013/0003191 | A1* | 1/2013  | Kanai .................. G02B 15/173 359/690 |

FOREIGN PATENT DOCUMENTS

| JP | 2009-192614 | 8/2009 |
| JP | 2009-251399 | 10/2009 |

(Continued)

OTHER PUBLICATIONS

International Search Report PCT/JP2013/004895 dated Dec. 17, 2013.

(Continued)

*Primary Examiner* — Joseph P Martinez
(74) *Attorney, Agent, or Firm* — Young & Thompson (57) ABSTRACT

An imaging lens consists of a first lens-group consisting of a positive lens with its surface that has the smaller absolute value of a curvature-radius facing an object-side, a positive lens in meniscus-shape with its convex-surface facing the object-side, a positive lens with its surface that has the smaller absolute value of a curvature-radius facing the object-side, and a negative lens with its surface that has the smaller absolute value of a curvature-radius facing an image-side, an aperture stop, a second lens-group consisting of a negative lens with its surface that has the smaller absolute value of a curvature-radius facing the object-side, a positive lens with its surface that has the smaller absolute value of a curvature-radius facing the image-side, and a positive lens, and a third lens-group consisting of a positive lens and a negative lens in this order from the object-side. A predetermined conditional expression is satisfied.

14 Claims, 7 Drawing Sheets

EXAMPLE 1

(56) References Cited

FOREIGN PATENT DOCUMENTS

| | | |
|---|---|---|
| JP | 2011-253050 | 12/2011 |
| JP | 2012-185263 | 9/2012 |

OTHER PUBLICATIONS

German Office Action dated Feb. 3, 2016; File No. 11 2013 004 313.0.

* cited by examiner

FIG.1
EXAMPLE 1

FIG.2
EXAMPLE 2

FIG.3  EXAMPLE 3

FIG.4  EXAMPLE 4

IMAGING LENS AND IMAGING APPARATUS

CROSS-REFERENCE TO RELATED APPLICATIONS

This application is a Continuation of PCT International Application No. PCT/JP2013/004895 filed on Aug. 19, 2013, which claims priority under 35 U.S.C. §119(a) to Japanese Patent Application No. 2012-188196 filed on Aug. 29, 2012. Each of the above applications is hereby expressly incorporated by reference, in its entirety, into the present application.

BACKGROUND OF THE INVENTION

1. Field of the Invention

The present invention relates to an imaging lens and an imaging apparatus. In particular, the present invention relates to an imaging lens used in electronic cameras, such as a digital camera, a camera for broadcasting, a camera for surveillance and a camera for film making, and an imaging apparatus including the imaging lens.

2. Description of the Related Art

As an imaging lens used in an imaging apparatus, such as a video camera and an electronic still camera, which uses an imaging device, such as a CCD (Charge Couple Device) and a CMOS (Complementary Metal Oxide Semiconductor), as a recording medium, imaging lenses, for example, as disclosed in Japanese Unexamined Patent Publication No. 2009-251399 (Patent Document 1) and Japanese Unexamined Patent Publication No. 2011-253050 (Patent Document 2) have been proposed.

SUMMARY OF THE INVENTION

As the definition of digital cameras and cameras for film making became high in recent years, imaging lenses in which various aberrations are excellently corrected have become needed. Further, a demand for imaging lenses having small F-number FNo., which are so-called fast imaging lenses, has been increasing. Further, when the imaging lens is used as an interchangeable lens, the imaging lens needs to have at least a shortest necessary length of back focus, and an incident angle of rays entering an image sensor in a peripheral area of an angle of view needs to be small to some extent.

In the imaging lens disclosed in Patent Document 1, various aberrations are excellently corrected, and an incident angle of rays entering an image sensor in a peripheral area of an angle of view is relatively small. However, a back focus is insufficient. Further, the total length of the imaging lens is long relative to the focal length of the imaging lens.

In the imaging lens disclosed in Patent Document 2, a total length is short, but an incident angle of rays entering an image sensor in a peripheral area of an angle of view is large.

In view of the foregoing circumstances, it is an object of the present invention to provide an imaging lens having a small FNo., and in which various aberrations are excellently corrected, and an incident angle of rays entering an image sensor in a peripheral area of an angle of view is small, and it is possible to secure a sufficient back focus, and also an imaging apparatus including this lens.

An imaging lens of the present invention consists of a first lens group, a stop, a second lens group that moves during focusing and has positive refractive power, and a third lens group that is fixed during focusing and has positive refractive power in this order from an object side. Further, the first lens group consists of an 11th lens having positive refractive power with its surface that has the smaller absolute value of a curvature radius facing the object side, a 12th lens having positive refractive power in meniscus shape with its convex surface facing the object side, a 13th lens having positive refractive power with its surface that has the smaller absolute value of a curvature radius facing the object side, and a 14th lens having negative refractive power with its surface that has the smaller absolute value of a curvature radius facing an image side in this order from the object side. Further, the second lens group consists of a 21st lens having negative refractive power with its surface that has the smaller absolute value of a curvature radius facing the object side, a 22nd lens having positive refractive power with its surface that has the smaller absolute value of a curvature radius facing the image side, and a 23rd lens having positive refractive power in this order from the object side. Further, the third lens group consists of a 31st lens having positive refractive power and a 32nd lens having negative refractive power in this order from the object side. Further, the following conditional expression is satisfied:

$$-0.1 < f/f1 < 0.2 \quad (1), \text{where}$$

f: a focal length of an entire system, and
f1: a focal length of the first lens group.

In the imaging lens of the present invention, it is desirable that the first lens group moves during focusing.

Further, it is desirable that the first lens group and the second lens group integrally move during focusing.

Further, it is desirable that the following conditional expression is satisfied:

$$-0.3 < (R12A - R12B)/(R12A + R12B) < 0 \quad (2), \text{where}$$

R12A: a curvature radius of an object-side surface of the 12th lens, and
R12B: a curvature radius of an image-side surface of the 12th lens.

Further, it is desirable that the following conditional expression is satisfied:

$$0.3 < Ds/L12 < 0.6 \quad (3), \text{where}$$

Ds: a sum of an air space immediately before the stop and an air space immediately after the stop, and
L12: a distance between a surface closest to the object side in the first lens group and a surface closest to the image side in the second lens group.

Further, it is desirable that the following conditional expression is satisfied:

$$1.2 < f/f2 < 1.7 \quad (4), \text{where}$$

f: a focal length of an entire system, and
f2: a focal length of the second lens group.

Further, it is desirable that the following conditional expression is satisfied:

$$0.1 < f/f3 < 0.6 \quad (5), \text{where}$$

f: a focal length of an entire system, and
f3: a focal length of the third lens group.

Further, it is desirable that the following conditional expression is satisfied:

$$35 < vd1p < 55 \quad (6), \text{where}$$

vd1p: an average Abbe number of all the positive lenses in the first lens group.

Further, it is desirable that the following conditional expression is satisfied:

$$-0.05 < f/f1 < 0.15 \quad (1\text{-}1).$$

Further, it is desirable that the following conditional expression is satisfied:

$$-0.25<(R12A-R12B)/(R12A+R12B)<-0.05 \quad (2\text{-}1).$$

Further, it is desirable that the following conditional expression is satisfied:

$$0.3<Ds/L12<0.5 \quad (3\text{-}1).$$

Further, it is desirable that the following conditional expression is satisfied:

$$1.25<f/f2<1.5 \quad (4\text{-}1).$$

Further, it is desirable that the following conditional expression is satisfied:

$$0.2<f/f3<0.5 \quad (5\text{-}1).$$

An imaging apparatus of the present invention includes the aforementioned imaging lens of the present invention.

An imaging lens of the present invention consists of a first lens group, a stop, a second lens group that moves during focusing and has positive refractive power, and a third lens group that is fixed during focusing and has positive refractive power in this order from an object side. Further, the first lens group consists of an 11th lens having positive refractive power with its surface that has the smaller absolute value of a curvature radius facing the object side, a 12th lens having positive refractive power in meniscus shape with its convex surface facing the object side, a 13th lens having positive refractive power with its surface that has the smaller absolute value of a curvature radius facing the object side, and a 14th lens having negative refractive power with its surface that has the smaller absolute value of a curvature radius facing an image side in this order from the object side. Further, the second lens group consists of a 21st lens having negative refractive power with its surface that has the smaller absolute value of a curvature radius facing the object side, a 22nd lens having positive refractive power with its surface that has the smaller absolute value of a curvature radius facing the image side, and a 23rd lens having positive refractive power in this order from the object side. Further, the third lens group consists of a 31st lens having positive refractive power and a 32nd lens having negative refractive power in this order from the object side. Further, the following conditional expression is satisfied. Therefore, it is possible to provide an imaging lens having a small FNo., and in which various aberrations are excellently corrected, and an incident angle of rays entering an image sensor in a peripheral area of an angle of view is small, and it is possible to secure a sufficient back focus.

$$-0.1<f/f1<0.2 \quad (1)$$

Further, the imaging apparatus of the present invention includes the imaging lens of the present invention. Therefore, bright video images with high image qualities are obtainable.

DESCRIPTION OF THE PREFERRED EMBODIMENTS

Figure 1:
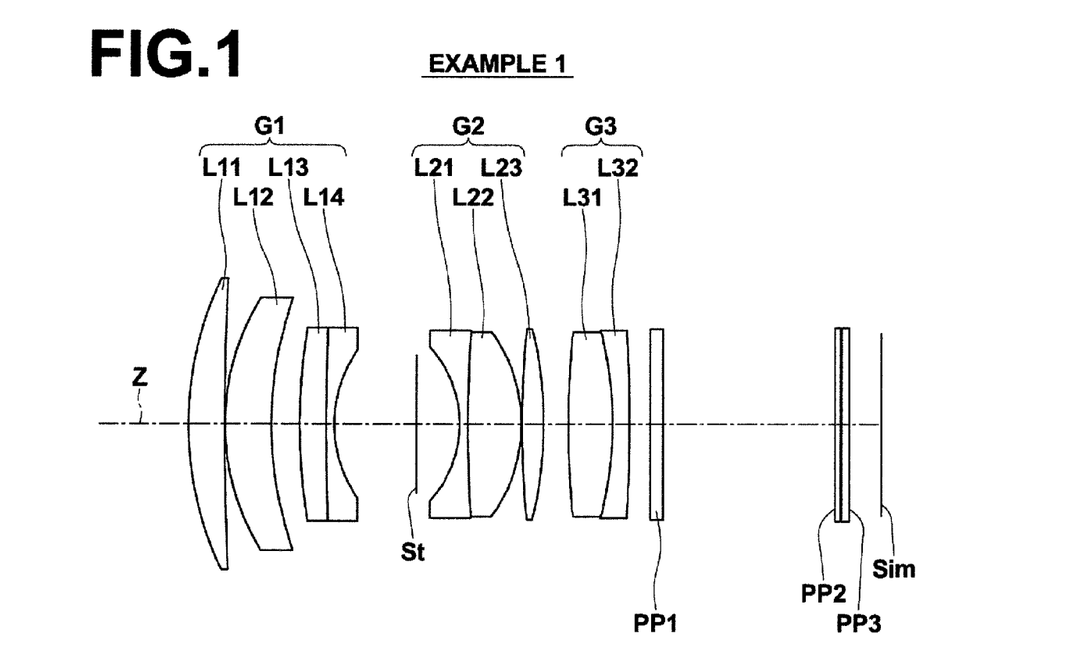
FIG. 1 is a cross section illustrating the lens configuration of an imaging lens according to an embodiment of the present invention (also Example 1)

Next, embodiments of the present invention will be described in detail with reference to drawings. FIG. 1 is a cross section illustrating the lens configuration of an imaging lens according to an embodiment of the present invention (also Example 1). An example of configuration illustrated in FIG. 1 is also the configuration of an imaging lens in Example 1, which will be described later. In FIG. 1, the left side is an object side, and the right side is an image side.

This imaging lens consists of first lens group G1, aperture stop St, second lens group G2 that moves during focusing and has positive refractive power, and third lens group G3 that is fixed during focusing and has positive refractive power, along optical axis Z, in this order from an object side. Here, aperture stop St illustrated in FIG. 1 does not necessarily represent the size nor the shape of the aperture stop, but a position on optical axis Z.

When this imaging lens is applied to an imaging apparatus, it is desirable to arrange a cover glass, a prism, and various filters, such as an infrared ray cut filter and a low-pass filter, between an optical system and image plane Sim based on the structure of a camera on which the lens is mounted. Therefore, FIG. 1 illustrates an example in which parallel-flat-plate-shaped optical members PP1, PP2, PP3, which are assumed to be such members, are arranged between third lens group G3 and image plane Sim.

First lens group G1 consists of 11 th lens L11 having positive refractive power with its surface that has the smaller absolute value of a curvature radius facing the object side, 12th lens L12 having positive refractive power in meniscus shape with its convex surface facing the object side, 13th lens L13 having positive refractive power with its surface that has the smaller absolute value of a curvature radius facing the object side, and 14th lens L14 having negative refractive power with its surface that has the smaller absolute value of a curvature radius facing an image side in this order from the object side.

Further, second lens group G2 consists of 21st lens L21 having negative refractive power with its surface that has the smaller absolute value of a curvature radius facing the object side, 22nd lens L22 having positive refractive power with its surface that has the smaller absolute value of a curvature radius facing the image side, and 23rd lens L23 having positive refractive power in this order from the object side.

Further, third lens group G3 consists of 31st lens L31 having positive refractive power and 32nd lens L32 having negative refractive power in this order from the object side.

Further, the imaging lens is configured in such a manner that the following conditional expression (1) is satisfied.

$$-0.1<f/f1<0.2 \quad (1), \text{where}$$

f: a focal length of an entire system, and
f1: a focal length of the first lens group.

In the imaging lens of the present invention, a so-called modified Gauss-type lens is configured by first lens group G1, aperture stop St, and second lens group G2 that has positive refractive power. When this lens is compared with a typical Gauss-type lens consisting of six lenses, more excellent correction of a spherical aberration is possible by changing two positive lenses arranged toward the object side of aperture stop St to three positive lenses. When 12th lens L12, which has been added in this case, has meniscus shape with its convex surface facing the object side, it is possible to reduce FNo. while suppressing generation of a spherical aberration and a coma aberration.

Further, when third lens group G3, which is fixed during focusing and has positive refractive power, is arranged toward the image side of second lens group G2, it is possible to suppress a fluctuation of curvature of field during focusing.

Further, when the lower limit of conditional expression (1) is satisfied, that is advantageous to reducing the total length. When the upper limit of conditional expression (1) is satisfied, that is advantageous to maintaining a back focus. Further, it is possible to give appropriate positive refractive power to second lens group G2 and third lens group G3, and to keep an incident angle of rays entering an image sensor in a peripheral area of an angle of view small.

Here, when the imaging lens satisfies the following conditional expression (1-1), more excellent characteristics are obtainable.

$$-0.05 < f/f1 < 0.15 \tag{1-1}$$

In the imaging lens of the present invention, it is desirable that first lens group G1 moves during focusing. When this mode is adopted, it is possible to excellently correct various aberrations through the entire focus range.

Further, it is desirable that first lens group G1 and second lens group G2 integrally move during focusing. When this mode is adopted, it is possible to simplify the structure of a focus mechanism.

Further, it is desirable that the following conditional expression (2) is satisfied. When conditional expression (2) is satisfied, it is possible to reduce FNo. while keeping generation of a spherical aberration and a coma aberration at a low level. When a certain degree of refractive power is given to 12th lens L12, if the value is lower than the lower limit of conditional expression (2), or if the value exceeds the upper limit of conditional expression (2), a spherical aberration due to under-correction tends to be generated. Therefore, when this conditional expression (2) is satisfied, a burden on other lenses as to correction of these aberrations is reduced. Here, when the imaging lens satisfies the following conditional expression (2-1), more excellent characteristics are obtainable.

$$-0.3 < (R12A - R12B)/(R12A + R12B) < 0 \tag{2; and}$$

$$-0.25 < (R12A - R12B)/(R12A + R12B) < -0.05 \tag{2-1, where}$$

R12A: a curvature radius of an object-side surface of the 12th lens, and
R12B: a curvature radius of an image-side surface of the 12th lens.

Further, it is desirable that the following conditional expression (3) is satisfied. When the lower limit of conditional expression (3) is satisfied, that is effective in correcting astigmatism. When the upper limit of conditional expression (3) is satisfied, that is advantageous to reducing a total length. Here, when the imaging lens satisfies the following conditional expression (3-1), more excellent characteristics are obtainable.

$$0.3 < Ds/L12 < 0.6 \tag{3; and}$$

$$0.3 < Ds/L12 < 0.5 \tag{3-1, where}$$

Ds: a sum of an air space immediately before the stop and an air space immediately after the stop, and
L12: a distance between a surface closest to the object side in the first lens group and a surface closest to the image side in the second lens group.

Further, it is desirable that the following conditional expression (4) is satisfied. When the lower limit of conditional expression (4) is satisfied, it is possible to keep an incident angle of rays entering an image sensor in a peripheral area of an angle of view small without making the refractive power of third lens group G3 too strong. When the upper limit of conditional expression (4) is satisfied, it is possible to keep a spherical aberration in an excellent state. Here, when the imaging lens satisfies the following conditional expression (4-1), more excellent characteristics are obtainable.

$$1.2 < f/f2 < 1.7 \tag{4; and}$$

$$1.25 < f/f2 < 1.5 \tag{4-1, where}$$

f: a focal length of an entire system, and
f2: a focal length of the second lens group.

Further, it is desirable that the following conditional expression (5) is satisfied. When the lower limit of conditional expression (5) is satisfied, it is possible to keep an incident angle of rays entering an image sensor in a peripheral area of an angle of view small. Further, it is possible to suppress a fluctuation of curvature of field due to focusing. When the upper limit of conditional expression (5) is satisfied, it is possible to make combined refractive power of first lens group G1 and second lens group G2 strong. Therefore, a movement amount during focusing is suppressed, and it becomes possible to reduce the size of the system. Further, it is possible to reduce time required for focusing. Here, when the imaging lens satisfies the following conditional expression (5-1), more excellent characteristics are obtainable.

$$0.1 < f/f3 < 0.6 \tag{5; and}$$

$$0.2 < f/f3 < 0.5 \tag{5-1, where}$$

f: a focal length of an entire system, and
f3: a focal length of the third lens group.

Further, it is desirable that the following conditional expression (6) is satisfied. When the lower limit of conditional expression (6) is satisfied, that is effective in correcting a longitudinal chromatic aberration. When the upper limit of conditional expression (6) is satisfied, that is effective in correcting secondary chromatic aberrations.

$$35 < vd1p < 55 \tag{6, where}$$

vd1p: an average Abbe number of all the positive lenses in the first lens group.

In the imaging lens of the present invention, it is desirable to use glass as a specific material arranged most toward the object side. Alternatively, transparent ceramic may be used.

When the imaging lens of the present invention is used in tough environments, it is desirable that a multilayer coating for protection is applied. Further, an anti-reflection coating for reducing ghost light or the like during usage may be applied besides the coating for protection.

FIG. 1 illustrates an example in which optical members PP1, PP2, PP3 are arranged between the lens system and image plane Sim. Instead of arranging various filters, such as a low-pass filter and a filter that cuts a specific wavelength band, between the lens system and image plane Sim, the various filters may be arranged between lenses. Alternatively, a coating having a similar action to that of the various filters may be applied to a lens surface of one of the lenses.

Next, numerical value examples of the imaging lens of the present invention will be described. Numerical values in the following tables 1 through 9 and aberration diagrams illustrated in FIGS. 5 through 8 are normalized so that the focal length of the entire system when the lens system is focused on an object at infinity is 100.

First, an imaging lens in Example 1 will be described. FIG. 1 is a cross section illustrating the lens configuration of the imaging lens in Example 1. Optical members PP1, PP2, PP3 are also illustrated in FIG. 1 and FIGS. 2 through 4 corresponding to Examples 2 through 4, which will be described later. Further, the left side is the object side, and the right side is the image side. Illustrated aperture stop St does not necessarily represent the size nor the shape of aperture stop, but a position on optical axis Z.

The imaging lens in Example 1 consists of first lens group G1, aperture stop St, second lens group G2 that moves during focusing and has positive refractive power, and third lens group G3 that is fixed during focusing and has positive refractive power, along optical axis Z, in this order from an object side.

First lens group G1 consists of 11 th lens L11 having positive refractive power in meniscus shape with its convex surface facing the object side, 12th lens L12 having positive refractive power in meniscus shape with its convex surface facing the object side, 13th lens L13 having positive refractive power in meniscus shape with its convex surface facing the object side, and 14th lens L14 having negative refractive power in meniscus shape with its concave surface facing an image side in this order from the object side. Here, 13th lens L13 and 14th lens L14 are cemented together.

Second lens group G2 consists of 21st lens L21 in biconcave shape with its surface that has the smaller absolute value of a curvature radius facing the object side, 22nd lens L22 in biconvex shape with its surface that has the smaller absolute value of a curvature radius facing the image side, and 23rd lens L23 in biconvex shape with its surface that has the smaller absolute value of a curvature radius facing the image side in this order from the object side. Here, 21st lens L21 and 22nd lens L22 are cemented together.

The third lens group G3 consists of 31st lens L31 in biconvex shape with its surface that has the smaller absolute value of a curvature radius facing the image side and 32nd lens L32 having negative refractive power in meniscus shape with its concave surface facing the object side in this order from the object side. Here, 31st lens L31 and 32nd lens L32 are cemented together.

When 11th lens L11 has a meniscus shape with its convex surface facing the object side, it is possible to suppress generation of astigmatism. When 12th lens L12 and 13th lens L13 have meniscus shapes, each of which has its convex surface facing the object side, it is possible to suppress generation of a spherical aberration, a coma aberration and astigmatism. When 14th lens L14 has a meniscus shape with its concave surface facing an image side, it is possible to reduce a difference in spherical aberrations according to wavelengths.

When 21st lens L21 has its surface that has the smaller absolute value of a curvature radius facing the object side, this surface and an image-side surface of 14th lens L14 are symmetric with aperture stop St therebetween. Therefore, it is possible to cancel out coma aberrations. When 22nd lens L22 has its surface that has the smaller absolute value of a curvature radius facing the image side, this surface and an object-side surface of 13th lens L13 are symmetric with aperture stop St therebetween. Therefore, it is possible to cancel out coma aberrations. Further, it is possible to suppress generation of astigmatism. When 23rd lens L23 has its surface that has the smaller absolute value of a curvature radius facing the image side, it is possible to suppress generation of astigmatism.

When 31st lens L31 has its surface that has the smaller absolute value of a curvature radius facing the image side, it is possible to suppress generation of astigmatism. When 32nd lens L32 has its surface that has the smaller absolute value of a curvature radius facing the object side, it is possible to suppress generation of astigmatism.

Table 1 shows basic lens data of the imaging lens in Example 1, and Table 2 shows data about specification of the imaging lens in Example 1. Next, the meanings of signs in the tables will be described by using Example 1 as an example. The meanings of signs in Examples 2 through 4 are basically similar to Example 1.

In the lens data of Table 1, a column of Si shows the surface number of i-th surface (i=1, 2, 3 . . . ) that sequentially increases toward the image side when a most object-side surface of composition elements is the first surface. A column of Ri shows the curvature radius of the i-th surface, and a column of Di shows a surface distance on optical axis Z between an i-th surface and an (i+1)th surface. Further, a column of Ndj shows a refractive index for d-line (wavelength is 587.6 nm) of a j-th optical element (j=1, 2, 3 . . . ) that sequentially increases toward the image side when a most object-side optical element is the first surface. Similarly, a column of vdj shows an Abbe number of the j-th optical element for d-line (wavelength is 587.6 nm).

Here, the sign of a curvature radius is positive when a surface shape is convex toward the object side, and negative when a surface shape is convex toward the image side. The basic lens data show also aperture stop St and optical member PP. In the column of surface numbers, the term "(STOP)" is written together with the surface number of a surface corresponding to aperture stop St.

Data about specification in Table 2 show focal length f', back focus BF', F-number Fno., and full angle 2ω of view.

In the basic lens data and the data about specification, degrees are used as the unit of angles. However, no unit is present for the other values because the values are normalized.

TABLE 1

EXAMPLE 1•LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 80.32644 | 8.595 | 1.74400 | 44.78 |
| 2 | 671.19394 | 0.133 | | |
| 3 | 56.55478 | 11.199 | 1.80610 | 33.27 |
| 4 | 90.66373 | 6.739 | | |
| 5 | 144.99505 | 6.342 | 1.49700 | 81.54 |
| 6 | 655.54098 | 1.843 | 1.84661 | 23.78 |
| 7 | 31.22907 | 19.600 | | |
| 8(STOP) | ∞ | 10.320 | | |
| 9 | −27.21338 | 1.941 | 1.51742 | 52.43 |
| 10 | 319.36441 | 12.741 | 1.61800 | 63.33 |
| 11 | −37.41115 | 0.135 | | |
| 12 | 235.29912 | 5.172 | 1.71299 | 53.87 |
| 13 | −94.97119 | 5.942 | | |
| 14 | 216.03099 | 10.662 | 1.49700 | 81.54 |
| 15 | −86.45397 | 3.989 | 1.58144 | 40.75 |
| 16 | −411.54561 | 4.937 | | |
| 17 | ∞ | 3.000 | 1.58832 | 41.28 |
| 18 | ∞ | 41.066 | | |
| 19 | ∞ | 1.333 | 1.51680 | 64.20 |
| 20 | ∞ | 0.267 | | |
| 21 | ∞ | 1.733 | 1.51680 | 64.20 |
| 22 | ∞ | 7.736 | | |

TABLE 2

EXAMPLE 1•SPECIFICATION (d-LINE)

| | |
|---|---|
| f | 100.00 |
| Bf | 57.92 |
| FNo. | 1.91 |
| 2ω[°] | 24.8 |

Figure 5:
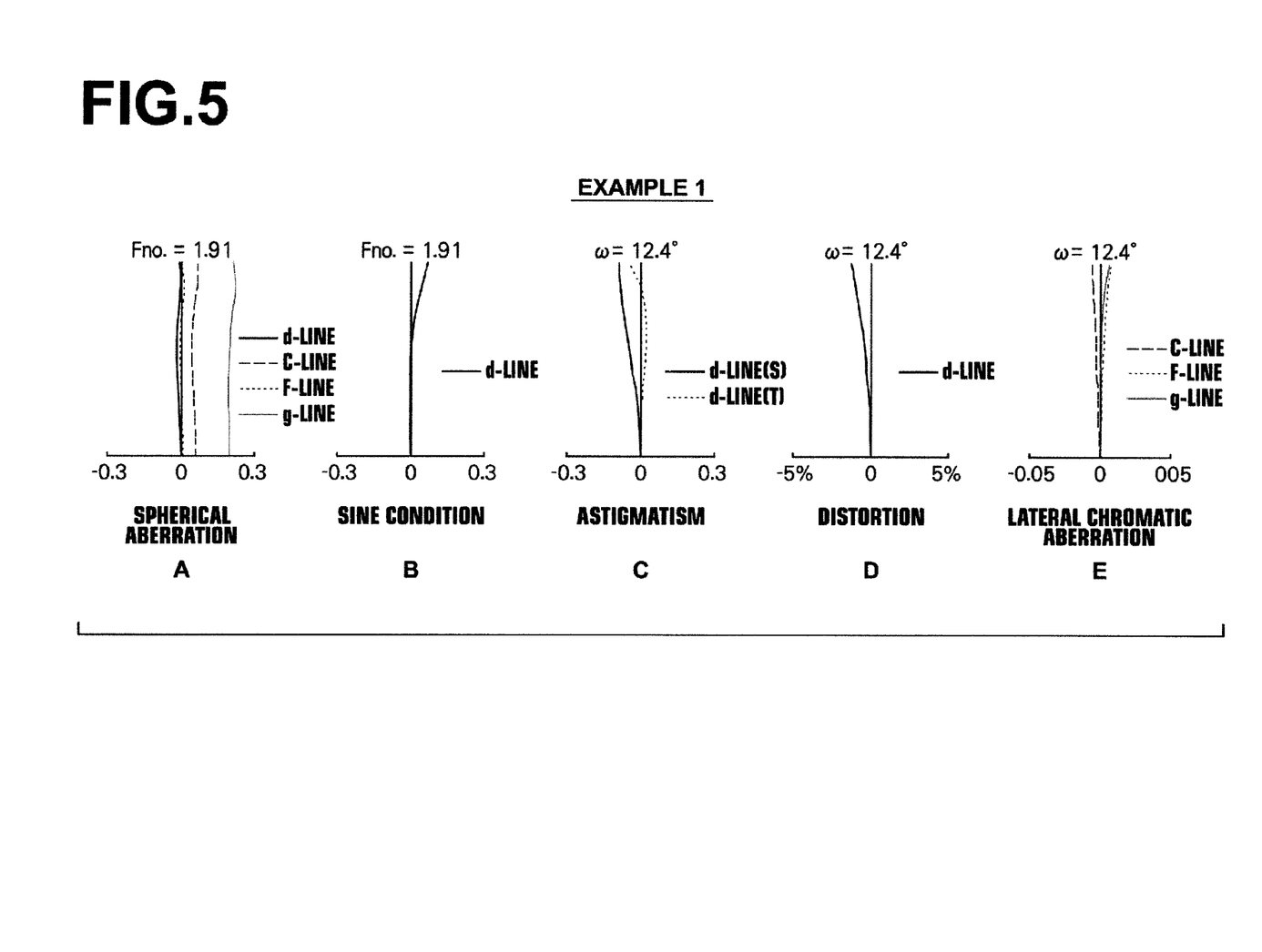
FIG. 5, Sections A through E are aberration diagrams of the imaging lens in Example 1 of the present invention.
Figure 6:
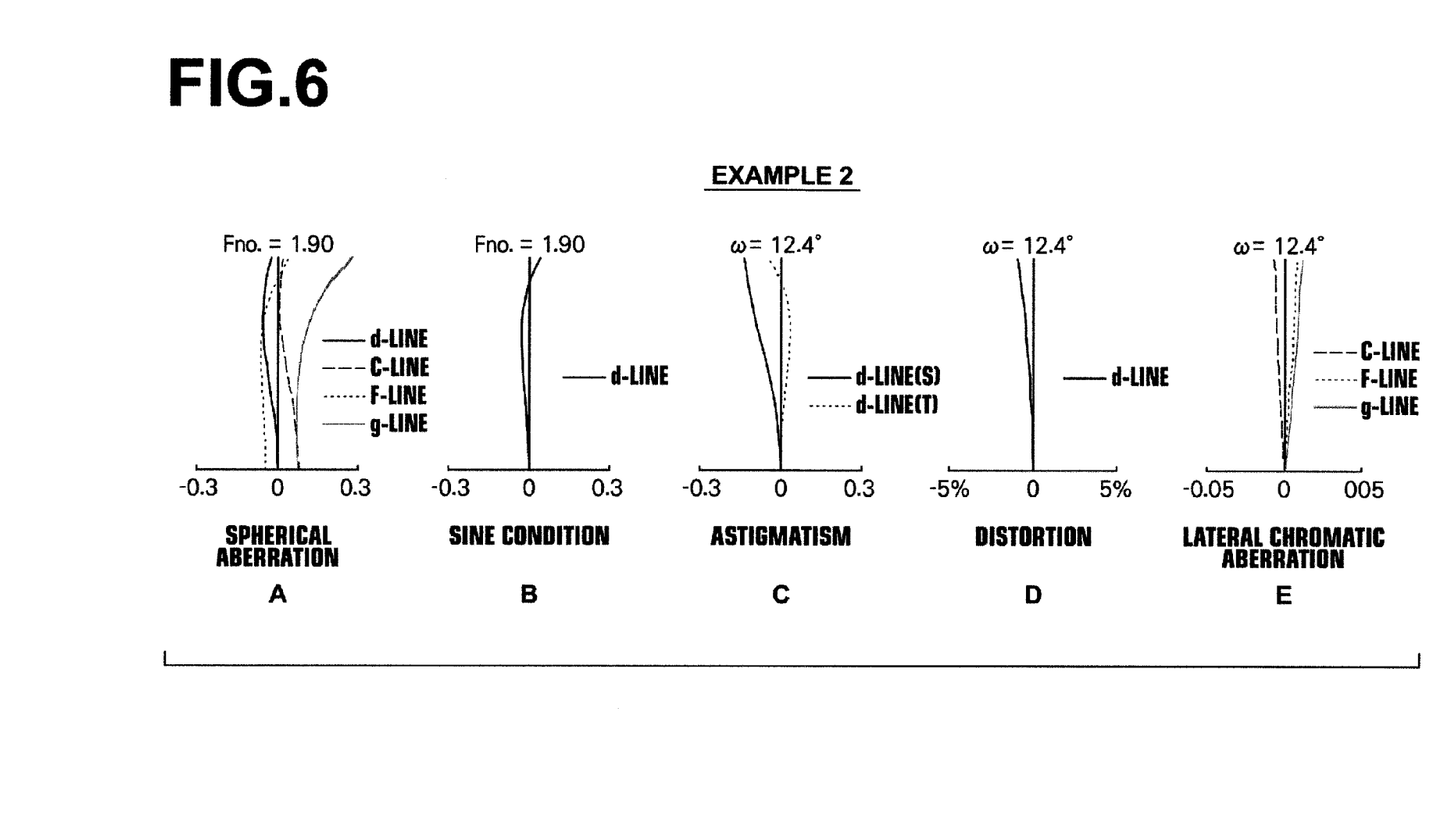
FIG. 6, Sections A through E are aberration diagrams of the imaging lens in Example 2 of the present invention.
Figure 7:
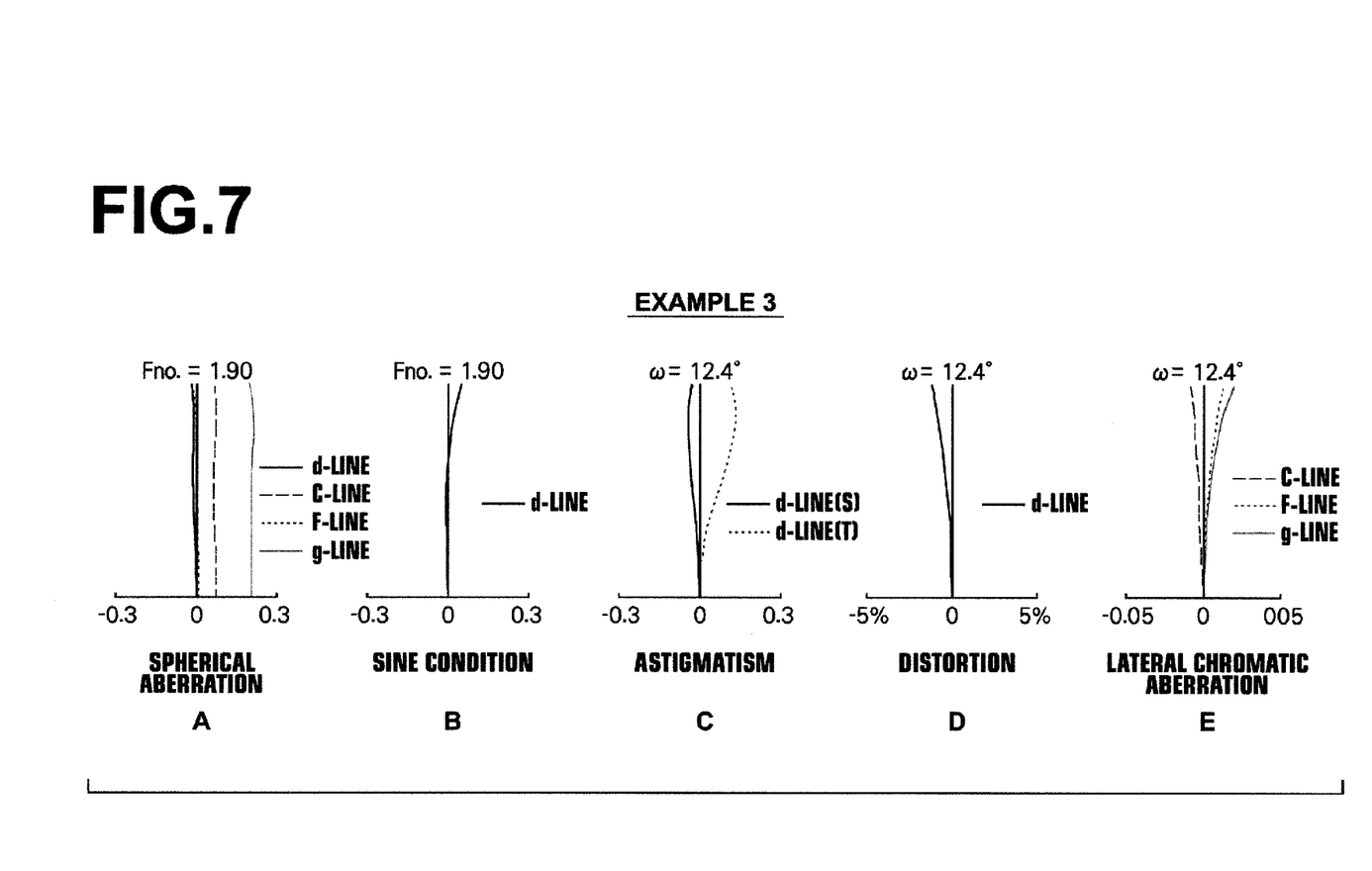
FIG. 7, Sections A through E are aberration diagrams of the imaging lens in Example 3 of the present invention.
Figure 8:
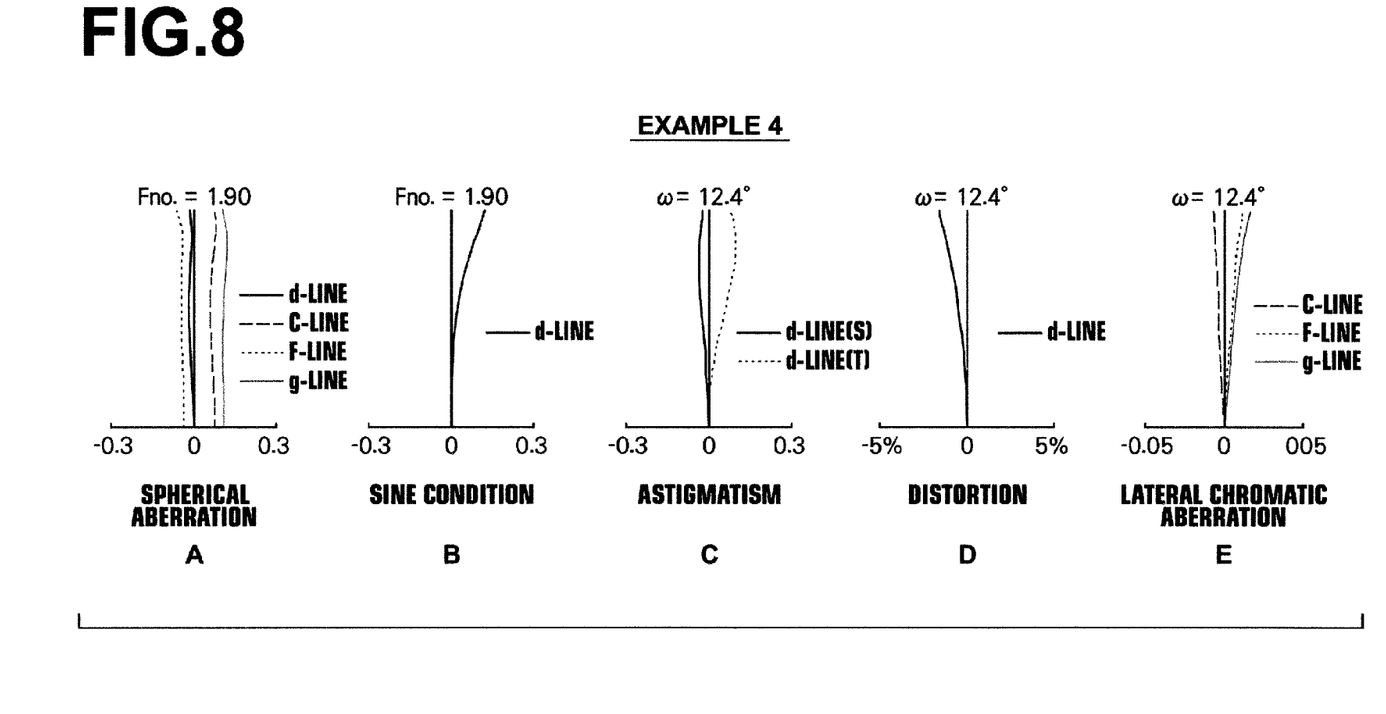
FIG. 8, Sections A through E are aberration diagrams of the imaging lens in Example 4 of the present invention.

FIG. 5, Sections A through E are aberration diagrams of the imaging lens in Example 1. FIG. 5, Sections A through E illustrate a spherical aberration, sine condition, astigmatism, distortion and a lateral chromatic aberration, respectively.

The aberration diagrams of a spherical aberration, sine condition, astigmatism and distortion illustrate aberrations when d-line (wavelength is 587.6 nm) is a reference wavelength. The aberration diagram of the spherical aberration illustrates aberrations for d-line (wavelength is 587.6 nm), C-line (wavelength is 656.3 nm), F-line (wavelength is 486.1 nm) and g-line (wavelength is 435.8 nm) by a solid line, a long broken line, a short broken line and a dotted line, respectively. The aberration diagram of the astigmatism illustrates aberrations for a sagittal direction and a tangential direction by a solid line and a broken line, respectively. The aberration diagram of the lateral chromatic aberration illustrates aberrations for C-line (wavelength is 656.3 nm), F-line (wavelength is 486.1 nm) and g-line (wavelength is 435.8 nm) by a long broken line, a short broken line and a dotted line, respectively. In the aberration diagram of the spherical aberration and the aberration diagram of sine condition, Fno. means an F-number. In the other diagrams, ω represents a half angle of view.

Figure 2:
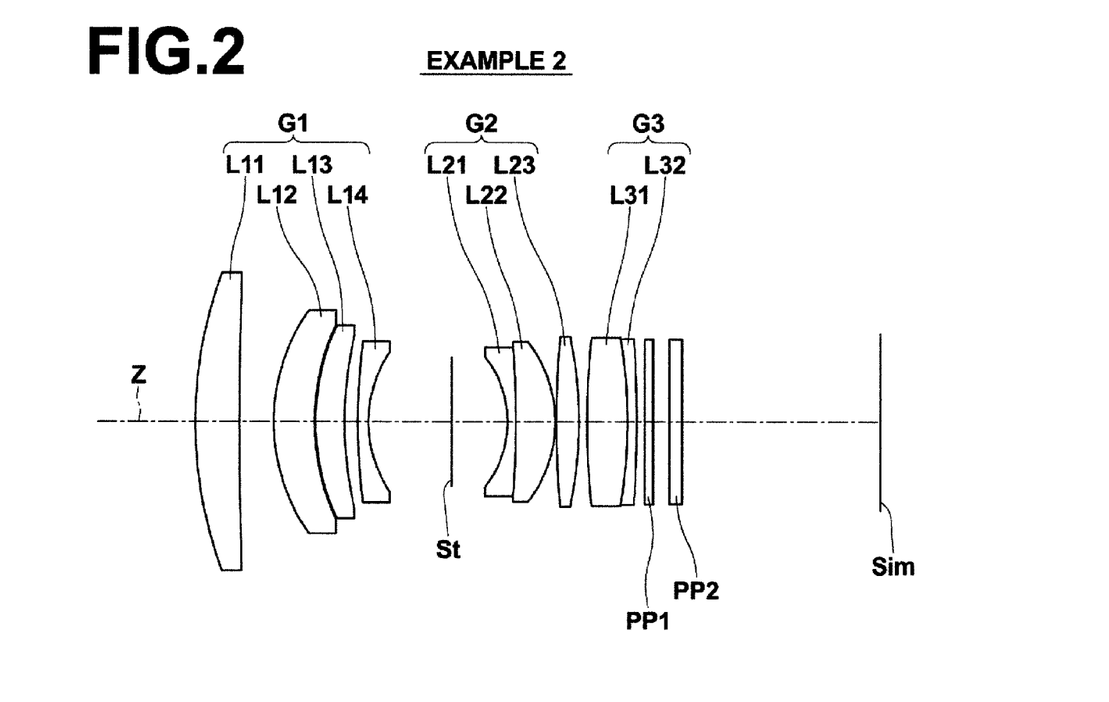
FIG. 2 is a cross section illustrating the lens configuration of an imaging lens in Example 2 of the present invention.

Next, an imaging lens in Example 2 will be described. FIG. 2 is a cross section illustrating the lens configuration of the imaging lens in Example 2.

The imaging lens in Example 2 is similar to the imaging lens in Example 1 except that 13th lens L13 and 14th lens L14 are not cemented together, and that a cemented surface of 21st lens L21 and 22nd lens L22 is a concave surface facing the object side. The absolute value of the curvature radius of the cemented surface of 21st lens L21 and 22nd lens L22 is large in a similar manner to Example 1. Therefore, there is no great difference in the effects.

Table 3 shows basic lens data of the imaging lens in Example 2, and Table 4 shows data about specification of the imaging lens in Example 2. Further, FIG. 6, Sections A through E are aberration diagrams of the imaging lens in Example 2.

TABLE 3

EXAMPLE 2•LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 106.14408 | 10.900 | 1.77250 | 49.60 |
| 2 | 1296.19109 | 8.489 | | |
| 3 | 48.35243 | 9.998 | 1.80518 | 25.42 |
| 4 | 56.95540 | 0.267 | | |
| 5 | 56.77243 | 7.040 | 1.61800 | 63.33 |
| 6 | 93.37192 | 3.349 | | |
| 7 | 163.36512 | 2.526 | 1.84666 | 23.78 |
| 8 | 30.94222 | 20.581 | | |
| 9(STOP) | ∞ | 13.670 | | |
| 10 | −26.13455 | 2.098 | 1.62004 | 36.26 |
| 11 | −231.89447 | 9.656 | 1.61800 | 63.33 |
| 12 | −32.00752 | 0.267 | | |
| 13 | 230.31263 | 5.674 | 1.83400 | 37.16 |
| 14 | −97.65407 | 1.980 | | |
| 15 | 196.10293 | 9.977 | 1.49700 | 81.54 |
| 16 | −120.41841 | 2.234 | 1.80610 | 33.27 |
| 17 | −318.64193 | 2.009 | | |

TABLE 3-continued

EXAMPLE 2•LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 18 | ∞ | 2.009 | 1.90682 | 21.20 |
| 19 | ∞ | 4.017 | | |
| 20 | ∞ | 3.080 | 1.51680 | 64.20 |
| 21 | ∞ | 48.916 | | |

TABLE 4

EXAMPLE 2•SPECIFICATION (d-LINE)

| | |
|---|---|
| f | 100.00 |
| Bf | 58.03 |
| FNo. | 1.90 |
| 2ω[°] | 24.8 |

Figure 3:
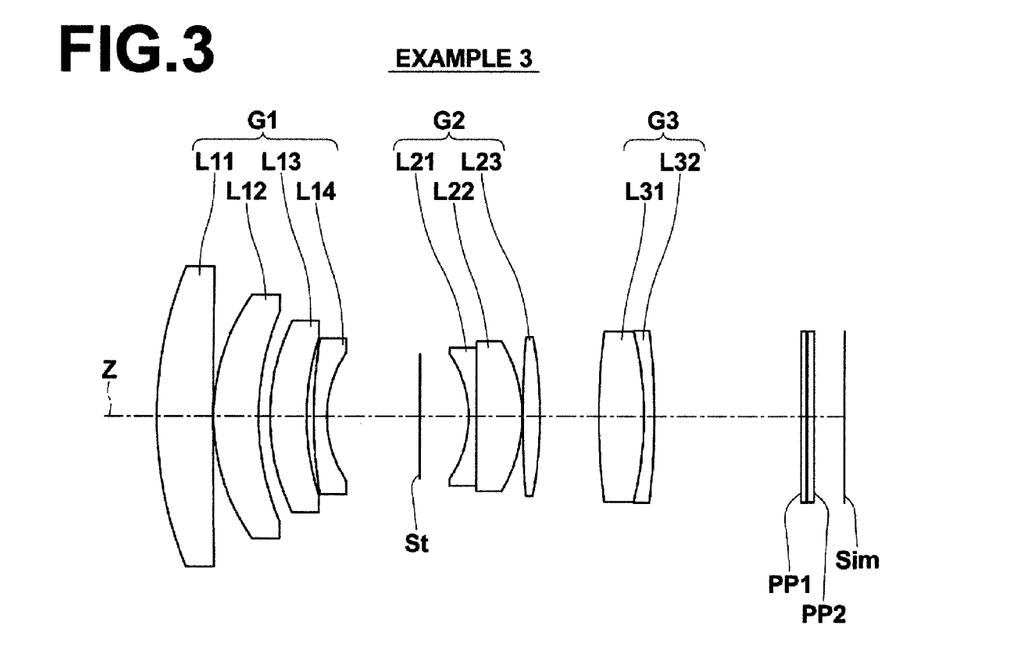
FIG. 3 is a cross section illustrating the lens configuration of an imaging lens in Example 3 of the present invention.

Next, an imaging lens in Example 3 will be described. FIG. 3 is a cross section illustrating the lens configuration of the imaging lens in Example 3.

The imaging lens in Example 3 has a similar shape to the imaging lens in Example 2.

Table 5 shows basic lens data of the imaging lens in Example 3, and Table 6 shows data about specification of the imaging lens in Example 3. Further, FIG. 7, Sections A through E are aberration diagrams of the imaging lens in Example 3.

TABLE 5

EXAMPLE 3•LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 100.63712 | 14.331 | 1.70154 | 41.24 |
| 2 | 2014.52281 | 0.133 | | |
| 3 | 53.93510 | 11.385 | 1.71299 | 53.87 |
| 4 | 68.84798 | 2.906 | | |
| 5 | 54.93004 | 9.353 | 1.80610 | 33.27 |
| 6 | 64.00342 | 1.854 | | |
| 7 | 124.15715 | 3.332 | 1.84666 | 23.78 |
| 8 | 29.33479 | 23.493 | | |
| 9(STOP) | ∞ | 12.556 | | |
| 10 | −27.90285 | 2.013 | 1.58144 | 40.75 |
| 11 | −2720.71456 | 11.605 | 1.71299 | 53.87 |
| 12 | −37.01591 | 0.132 | | |
| 13 | 255.17819 | 4.433 | 1.74400 | 44.78 |
| 14 | −109.02860 | 14.799 | | |
| 15 | 162.91070 | 11.555 | 1.49700 | 81.54 |
| 16 | −90.89983 | 2.667 | 1.84666 | 23.78 |
| 17 | −186.79591 | 37.332 | | |
| 18 | ∞ | 1.333 | 1.51680 | 64.20 |
| 19 | ∞ | 0.267 | | |
| 20 | ∞ | 1.733 | 1.51680 | 64.20 |
| 21 | ∞ | 7.759 | | |

TABLE 6

EXAMPLE 3•SPECIFICATION (d-LINE)

| | |
|---|---|
| f | 100.00 |
| Bf | 47.38 |
| FNo. | 1.90 |
| 2ω[°] | 24.8 |

Figure 4:
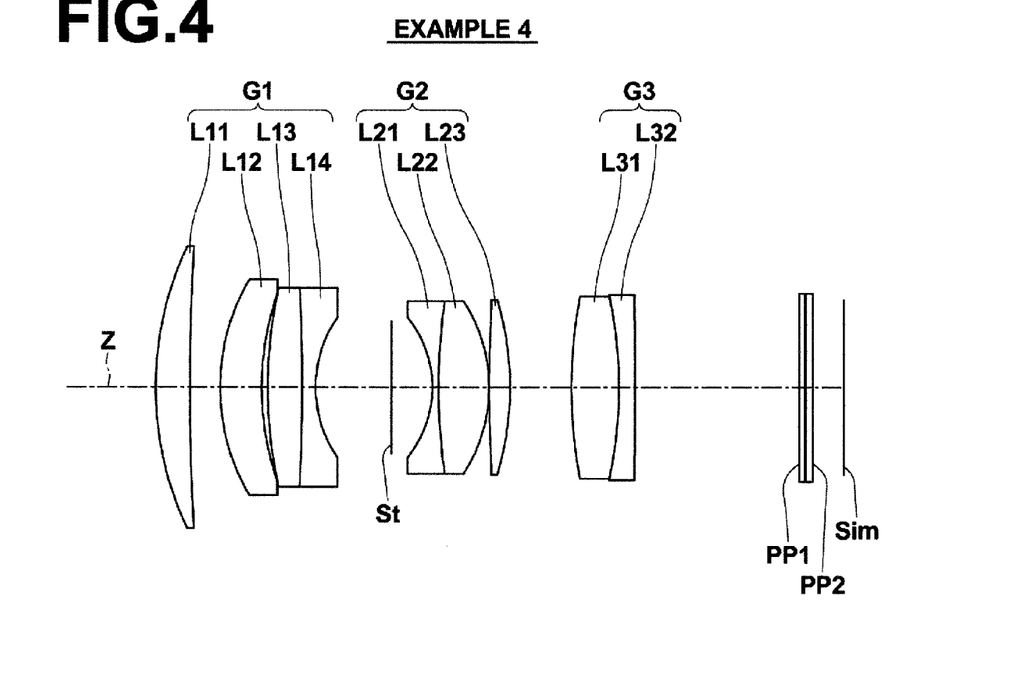
FIG. 4 is a cross section illustrating the lens configuration of an imaging lens in Example 4 of the present invention.

Next, an imaging lens in Example 4 will be described. FIG. 4 is a cross section illustrating the lens configuration of the imaging lens in Example 4.

The imaging lens in Example 4 is similar to the imaging lens in Example 1 except that the cemented surface of 13th lens L13 and 14th lens L14 is a concave surface facing the object side. The absolute value of the curvature radius of the cemented surface of 13th lens L13 and 14th lens L14 is large in a similar manner to Example 1. Therefore, there is no great difference in the effects.

Table 7 shows basic lens data of the imaging lens in Example 4, and Table 8 shows data about specification of the imaging lens in Example 4. Further, FIG. 8, Sections A through E are aberration diagrams of the imaging lens in Example 4.

TABLE 7

EXAMPLE 4·LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 81.50514 | 8.543 | 1.80610 | 33.27 |
| 2 | 612.45693 | 7.471 | | |
| 3 | 53.44536 | 10.255 | 1.83400 | 37.16 |
| 4 | 71.74002 | 1.510 | | |
| 5 | 114.64171 | 8.593 | 1.53715 | 74.81 |
| 6 | −487.45056 | 3.333 | 1.84666 | 23.78 |
| 7 | 30.52797 | 18.693 | | |
| 8(STOP) | ∞ | 10.168 | | |
| 9 | −27.39761 | 1.613 | 1.51742 | 52.43 |
| 10 | 158.78094 | 12.547 | 1.61800 | 63.33 |
| 11 | −39.10354 | 0.133 | | |
| 12 | 548.33896 | 5.111 | 1.71299 | 53.87 |
| 13 | −74.49228 | 15.190 | | |
| 14 | 124.10376 | 11.750 | 1.49700 | 81.54 |
| 15 | −106.99366 | 4.000 | 1.54814 | 45.79 |
| 16 | −2419.83302 | 40.818 | | |
| 17 | ∞ | 1.333 | 1.51680 | 64.20 |
| 18 | ∞ | 0.267 | | |
| 19 | ∞ | 1.733 | 1.51680 | 64.20 |
| 20 | ∞ | 7.789 | | |

TABLE 8

EXAMPLE 4·SPECIFICATION (d-LINE)

| | |
|---|---|
| f | 100.00 |
| Bf | 50.90 |
| FNo. | 1.90 |
| 2ω[°] | 24.8 |

Table 9 shows values corresponding to conditional expressions (1) through (6) about the imaging lenses in Examples 1 through 4. In all of the examples, d-line is a reference wavelength. The following Table 9 shows values at this reference wavelength.

As the data show, all the imaging lenses in Examples 1 through 4 satisfy conditional expressions (1) through (6). It is recognizable that the imaging lenses are fast lenses, and that various aberrations are excellently corrected in the imaging lenses.

Figure 9:
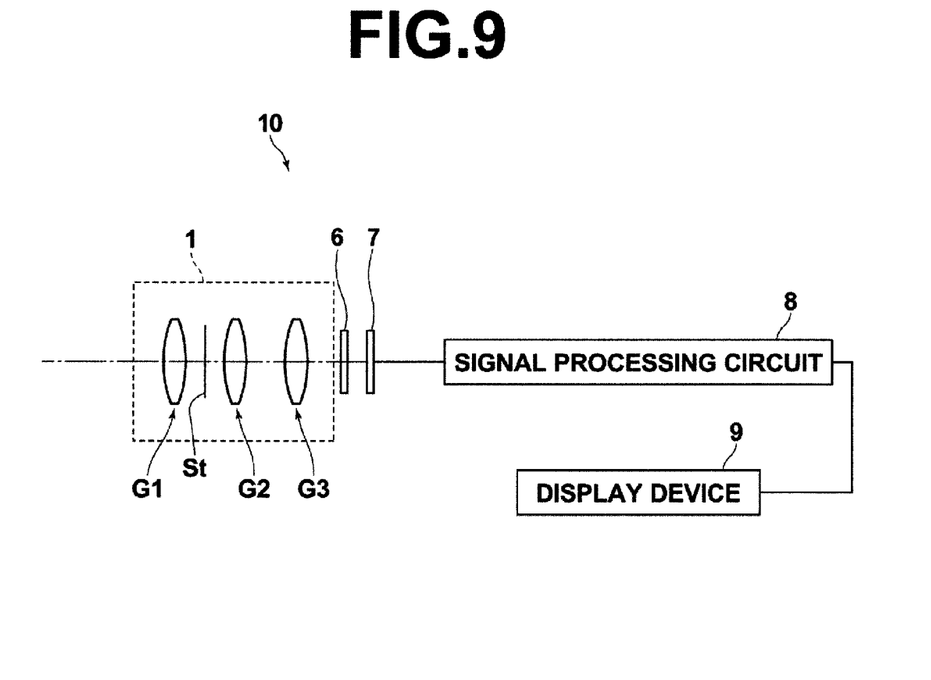
FIG. 9 is a schematic diagram illustrating the configuration of an imaging apparatus according to an embodiment of the present invention.

Next, an imaging apparatus according to an embodiment of the present invention will be described. FIG. 9 is a schematic diagram illustrating the configuration of an imaging apparatus using an imaging lens according to an embodiment of the present invention, as an example of an imaging apparatus according to an embodiment of the present invention. In FIG. 9, each lens group is schematically illustrated. This imaging apparatus is, for example, a video camera, an electronic still camera or the like using a solid-state imaging device, such as a CCD and a CMOS, as a recording medium.

An imaging apparatus 10, such as a video camera, illustrated in FIG. 9 includes an imaging lens 1, a filter 6, an imaging device 7 and a signal processing circuit 8. The filter 6 is arranged toward the image side of the imaging lens 1, and has a function as a low-pass filter or the like, and the imaging device 7 is arranged toward the image side of the filter 6. The imaging device 7 converts an optical image formed by the imaging lens 1 into electrical signals. For example, a CCD (Charge Coupled Device), a CMOS (Complementary Metal Oxide Semiconductor) and the like may be used as the imaging device 7. The imaging device 7 is arranged in such a manner that an imaging surface of the imaging device 7 and the image plane of the imaging lens 1 match with each other.

An image imaged by the imaging lens 1 is formed on an imaging surface of the imaging device 7. Signals about the image are output from the imaging device 7, and operation processing is performed on the output signals at the signal processing circuit 8. Further, an image is displayed on a display device 9.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens element are not limited to the values in the numerical value examples, but may be other values.

What is claimed is:

1. An imaging lens consisting of:
a first lens group;
a stop;
a second lens group that moves during focusing and has positive refractive power; and
a third lens group that is fixed during focusing and has positive refractive power in this order from an object side,
wherein the first lens group consists of an 11th lens having positive refractive power with its surface that has the smaller absolute value of a curvature radius facing the object side, a 12th lens having positive refractive power in meniscus shape with its convex surface facing the

TABLE 9

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | f/f1 | 0.02 | 0.09 | 0.05 | −0.04 |
| (2) | (R12A − R12B)/(R12A + R12B) | −0.23 | −0.08 | −0.12 | −0.15 |
| (3) | Ds/L12 | 0.35 | 0.36 | 0.37 | 0.33 |
| (4) | f/f2 | 1.29 | 1.31 | 1.29 | 1.27 |
| (5) | f/f3 | 0.27 | 0.25 | 0.37 | 0.38 |
| (6) | vd1p | 53.20 | 46.12 | 42.79 | 48.41 | object side, a 13th lens having positive refractive power with its surface that has the smaller absolute value of a curvature radius facing the object side, and a 14th lens having negative refractive power with its surface that has the smaller absolute value of a curvature radius facing an image side in this order from the object side, and wherein the second lens group consists of a 21st lens having negative refractive power with its surface that has the smaller absolute value of a curvature radius facing the object side, a 22nd lens having positive refractive power with its surface that has the smaller absolute value of a curvature radius facing the image side, and a 23rd lens having positive refractive power in this order from the object side, and wherein the third lens group consists of a 31st lens having positive refractive power and a 32nd lens having negative refractive power in this order from the object side, and wherein the following conditional expression is satisfied:

$$-0.1 < f/f1 < 0.2 \quad (1),\text{ where}$$

f: a focal length of an entire system, and
f1: a focal length of the first lens group.

2. The imaging lens, as defined in claim 1, wherein the first lens group moves during focusing.

3. The imaging lens, as defined in claim 1, wherein the first lens group and the second lens group integrally move during focusing.

4. The imaging lens, as defined in claim 1, wherein the following conditional expression is satisfied:

$$-0.3 < (R12A - R12B)/(R12A + R12B) < 0 \quad (2),\text{ where}$$

R12A: a curvature radius of an object-side surface of the 12th lens, and
R12B: a curvature radius of an image-side surface of the 12th lens.

5. The imaging lens, as defined in claim 1, wherein the following conditional expression is satisfied:

$$0.3 < Ds/L12 < 0.6 \quad (3),\text{ where}$$

Ds: a sum of an air space immediately before the stop and an air space immediately after the stop, and
L12: a distance between a surface closest to the object side in the first lens group and a surface closest to the image side in the second lens group.

6. The imaging lens, as defined in claim 1, wherein the following conditional expression is satisfied:

$$1.2 < f/f2 < 1.7 \quad (4),\text{ where}$$

f: a focal length of an entire system, and
f2: a focal length of the second lens group.

7. The imaging lens, as defined in claim 1, wherein the following conditional expression is satisfied:

$$0.1 < f/f3 < 0.6 \quad (5),\text{ where}$$

f: a focal length of an entire system, and
f3: a focal length of the third lens group.

8. The imaging lens, as defined in claim 1, wherein the following conditional expression is satisfied:

$$35 < vd1p < 55 \quad (6),\text{ where}$$

vd1p: an average Abbe number of all the positive lenses in the first lens group.

9. The imaging lens, as defined in claim 1, wherein the following conditional expression is satisfied:

$$-0.05 < f/f1 < 0.15 \quad (1\text{-}1),\text{ where}$$

f: a focal length of an entire system, and
f1: a focal length of the first lens group.

10. The imaging lens, as defined in claim 1, wherein the following conditional expression is satisfied:

$$-0.25 < (R12A - R12B)/(R12A + R12B) < -0.05 \quad (2\text{-}1),\text{ where}$$

R12A: a curvature radius of an object-side surface of the 12th lens, and
R12B: a curvature radius of an image-side surface of the 12th lens.

11. The imaging lens, as defined in claim 1, wherein the following conditional expression is satisfied:

$$0.3 < Ds/L12 < 0.5 \quad (3\text{-}1),\text{ where}$$

Ds: a sum of an air space immediately before the stop and an air space immediately after the stop, and
L12: a distance between a surface closest to the object side in the first lens group and a surface closest to the image side in the second lens group.

12. The imaging lens, as defined in claim 1, wherein the following conditional expression is satisfied:

$$1.25 < f/f2 < 1.5 \quad (4\text{-}1),\text{ where}$$

f: a focal length of an entire system, and
f2: a focal length of the second lens group.

13. The imaging lens, as defined in claim 1, wherein the following conditional expression is satisfied:

$$0.2 < f/f3 < 0.5 \quad (5\text{-}1),\text{ where}$$

f: a focal length of an entire system, and
f3: a focal length of the third lens group.

14. An imaging apparatus comprising:
the imaging lens, as defined in claim 1.

* * * * *